United States Patent [19]

Tsunashima et al.

[11] 4,041,206

[45] Aug. 9, 1977

[54] LAMINATED POLYESTER FILM

[75] Inventors: Kenji Tsunashima, Kyoto; Masanao Sugioka; Atsuhiko Soda, both of Otsu; Hiroyuki Ikeuchi; Michihiko Tanaka, both of Ehime, all of Japan

[73] Assignee: Toray Industries, Inc., Tokyo, Japan

[21] Appl. No.: 642,182

[22] Filed: Dec. 18, 1975

Related U.S. Application Data

[63] Continuation-in-part of Ser. No. 447,578, March 3, 1974, abandoned.

[51] Int. Cl.² ............... B32B 27/36; B32B 7/10; B32B 31/20; B32B 31/26
[52] U.S. Cl. .................. 428/409; 428/480; 428/482; 428/910
[58] Field of Search ............ 428/480, 482, 910, 409, 428/347, 349

[56] References Cited

U.S. PATENT DOCUMENTS

| | | | |
|---|---|---|---|
| 2,865,891 | 12/1958 | Michel | 260/75 |
| 2,898,237 | 8/1959 | Sapper | 428/348 |
| 2,961,365 | 11/1960 | Sroog | 428/285 |
| 2,976,185 | 3/1961 | McBride | 428/447 |
| 2,977,336 | 3/1961 | Blatz | 260/37 |
| 2,992,133 | 7/1961 | Zehrung | 428/349 |
| 3,022,192 | 2/1962 | Brandt | 428/349 X |
| 3,261,881 | 7/1966 | Christenson et al. | 260/826 |
| 3,455,720 | 7/1969 | Davies et al. | 428/349 |
| 3,498,952 | 3/1970 | Wiener | 260/75 |
| 3,505,293 | 4/1970 | Bond et al. | 260/75 |
| 3,898,358 | 8/1975 | Ryan et al. | 428/480 |
| 3,900,653 | 8/1975 | Riboulet et al. | 428/480 |
| 3,941,904 | 3/1976 | Hoh et al. | 428/480 |
| 3,950,206 | 4/1976 | Adachi et al. | 428/480 X |
| 3,958,072 | 5/1976 | Araki et al. | 428/482 X |
| 3,959,062 | 5/1976 | Hoh et al. | 428/480 X |
| 3,983,285 | 9/1976 | Riboulet et al. | 428/480 X |

*Primary Examiner*—Harold Ansher

[57] ABSTRACT

Laminated polyester film having a base layer of biaxially oriented polyethylene terephthalate or polybutylene terephthalate is laminated directly by heat sealing and without the use of any intervening adhesive with a crystalline butylene terephthalate or hexylene terephthalate copolyester blended with from about 10 to 40 weight % of a polyethylene terephthalate or polybutylene terephthalate, said copolyester containing about from 50 to about 80 mole % of terephthalic acid units based on the total acid component of the copolyester.

5 Claims, No Drawings

LAMINATED POLYESTER FILM

RELATED APPLICATION

This application is a continuation-in-part of our co-pending U.S. application Ser. No. 447,578, filed Mar. 3, 1974, now abandoned.

BACKGROUND OF THE INVENTION

It is generally known that biaxially oriented polyethylene terephthalate (hereinafter referred to as "PET") and polybutylene terephthalate (hereinafter referred to as "PBT") films are not adhesive under the influence of heat under ordinary heat sealing conditions. When designed for adhering to glass, ceramics, metals and the like, the PET or PBT films are laminated at least on one side with heat sealable materials such as polyethylene, ethylene-vinylacetate copolymer, etc. However, these laminated films have disadvantages including high manufacturing cost and/or poor slipperiness. Manufacturing these films requires at least three processes: biaxially stretching, primer coating or surface treating, and laminating, which makes the manufacturing cost high. Since those polymers are incompatible with PET or PBT, these films are difficult to recover without degrading or coloring the polymer. Further, these films are sometimes hazy or sticky and have low adhesive strengths at higher temperatures.

The U.S. patent to Wiener U.S. Pat. No. 3,498,952 discloses terephthalate copolyesters containing up to 70 mol percent of polymethylene glycol, 30 to 100 mol percent of 2-methyl-2-phenyl-1,3-propanediol units.

The copolymers of Wiener are used to form resins which form useful coatings and laminates with various substrates such as wood, paper, plastic, leather, glass, iron, steel, copper and aluminum to form effective insulating layers. If desired, the resins of Wiener may be compounded with pigments, fillers, stabilizers, plasticizers and other compounding agents. However, these products containing up to 70 mol percent of polymethylene glycol units and from 30 to 100 mol percent of 2-methyl-2-phenyl-1,3-propanediol units are substantially non-crystalline products, and are said in the Weiner patent to possess "high softening points". There is no suggestion in the Wiener patent of the idea of preparing a laminated film which can be manufactured in a single process, and which has better heat-adhesive properties and improved slipperiness as compared to the films contemplated by Wiener.

The U.S. patent to Sroog U.S. Pat. No. 2,961,365 discloses laminations of polymeric linear terephthalate ester structures, e.g., films and fabrics, with a second layer of material by making use of an intermediate adhesive layer of copolyester between them. The adhesive layer consists of a polyester of a polymethylene glycol having 2 to 10 carbon atoms per molecule with a dicarboxylic acid selected from the group consisting of isophthalic acid, hexahydroterephthalic acid, and mixtures of terephthalic acid, isophthalic acid and/or hexahydroterephthalic acid. Such a film is very limited with respect to properties of slipperiness and transparency coupled with heat-sealing strength, and waste films laminated with the blend cannot be practically reused or recycled as melt-extrusion products, since they can only be handled with great difficulty.

In light of these deficiencies, it is an object of this invention to create a laminated film which can be manufactured in a single process and which has better heat-adhesive properties and improved slipperiness as compared to films of the prior art. In accordance with this invention, it has been found that an improved laminated polyester film can be produced without the aforementioned disadvantages and that the laminated polyester film is transparent, tough, slippery and has excellent heat-adhesive properties.

Another object of this invention is to provide a superior laminated polyester film which uses no extra adhesive layer to adhere the lamina together and which is much improved in slipperiness and has excellent heat-adhesive strength at high temperature, and which can be manufactured efficiently and with economy.

Still another object of this invention is to provide a laminated polyester film which is suitable for use in general packaging, for photographic films, and as a base for electrical insulation.

According to the present invention, we provide an improved laminated polyester film which is suitable for general use in packaging, as a photographic base or for electrical insulation, for example.

SUMMARY OF THE INVENTION

This invention relates to a laminated polyester film having, as combined properties, high heat-adhesive strength and slipperiness. This film comprises a PET or PBT film having at least one surface which is laminated with and adhered directly by heat sealing, without any intervening adhesive, to a crystalline butylene terephthalate or hexylene terephthalate copolyester blended with from about 10 to 40 weight % of PET or PBT, said copolyester containing from about 50 to 80 mole % of terephthalic acid units based on the weight of the total acid component of the copolyester.

This invention is sharply distinguishable over the aforesaid Wiener patent, in that the copolymers of this invention do not contain 2-methyl-2-phenyl-1,3-propanediol, but contain 100 mol percent of 1,4-butanediol or 1,6-hexanediol. Further, the copolymer in accordance with this invention is blended with a polyester selected from the group consisting of polyethylene terephthalate and polybutylene terephthalate, as distinguished sharply from the Wiener copolymer. Further, the copolymers in accordance with this invention are crystalline, whereas the copolymers of the Wiener patent are substantially non-crystalline. These important differences between the heat sealable layers of this invention, and the copolymers of the Wiener patent, result in distinctive differences in physical properties and processabilities as will further appear in greater detail hereinafter.

When the copolyesters of the Wiener patent are used as laminated or coated layers, the laminated films produced have sticky or non-slippery surfaces, and are difficult to process. Moreover, waste films laminated with the copolyesters of the Weiner patent cannot be practically reused as melt-extrusion products since they cannot be dried without sticking together to form large blocks at conventional drying temperatures for copolyesters. On the contrary, when the crystalline copolymers of this invention are blended with a polyester selected from the group consisting of polyethylene terephthalate and polybutylene terephthalate, and the blends are used as laminated layers, the laminated polyester film of this invention has slippery surfaces and far better winding characteristics and processability than the laminated film of the Wiener patent. Moreover, waste films laminated with the blend of a crystalline copolymer and a polyester in accordance with this invention can be reused or recycled as melt-extrusion products, since they can be dried at a conventional drying temperature which is applicable to copolymers, without forming blocks.

In accordance with this invention, the specific components contained in the blend of the laminated layer are important. The combination of the crystalline copolymer such as polybutylene terephthalate isophthalate, polyhexylene terephthalate isophthalate, and a polyester, such as polyethylene terephthalate or polybutylene terephthalate, insures transparency and slipperiness of the laminated polyester film without lowering the heat sealing strength of the material.

Reference has heretofore been made to the U.S. patent to Sroog U.S. Pat. No. 2,961,365. Sroog discloses laminations of polymeric linear terephthalate ester structures, e.g., films and fabrics with a second layer of material by making use of an intermediate adhesive layer of copolyester. The adhesion layer consists of a polyester of a polymethylene glycol having 2 to 10 carbon atoms per molecule with a dicarboxylic acid selected from the group consisting of isophthalic acid, hexahydroterephthalic acid, and mixtures of terephthalic acid, isophthalic acid and/or hexahydroterephthalic acid. Products according to this invention are heat adhesive layers consisting of a blend of a crystalline copolymer and a polyester, while the heat adhesive layer of Sroog consists of a copolyester. It is important that, by blending a polyester such as polyethylene terephthalate or polybutylene terephthalate, with a copolymer such as polybutylene terephthalate isophthalate or polyhexalene terephthalate isophthalate, a laminated polyester film is produced which has excellent properties of slipperiness and transparency without reducing the heat-sealing strength of the material. Accordingly, waste films laminated with the blend in accordance with this invention can be reused or recycled as melt-extrusion products since they can be handled without difficulty. The blend can be co-extruded together with a polyester such as polyethylene terephthalate or polybutylene terephthalate, biaxially stretched and heat set, or it can be extrusion-laminated on a longitudinally stretched polyester film and then stretched transversely and heat set. The laminated polyester film so obtained has superior properties of transparency, slipperiness and heat-adhesive strength.

DETAILED DESCRIPTION OF THE INVENTION

This invention relates to a laminated polyester film comprising a PET or PBT film having at least one surface laminated directly and without any intervening adhesive to a blend consisting of a polyester and a specific copolyester. The specific copolyester is a crystalline butylene terephthalate or hexylene terephthalate copolyester, which contains from about 50 to 80 mole %, preferably from about 60 to 70 mole %, of terephthalic acid units based on the total acid component of the copolyester. If the proportion of terephthalic acid units based on the total acid component of this copolyester is other than about 50 – 80 mole %, the laminated polyester films lose the above-mentioned superior properties, such as high heat-adhesive strength at high temperatures, good slipperiness and transparency.

Other acid components of the crystalline copolyester used in this invention with terephthalic acid comprise, for example, phthalic acid, isophthalic acid, saturated aliphatic dicarboxylic acids containing 6 – 14 carbon atoms, such as adipic acid, sebacic acid, decane-1,10-dicarboxylic acid, dodecane-1,12-dicarboxylic acid, etc., but isophthalic acid is preferable.

A crystalline copolyester such as butylene terephthalate isophthalate copolyester or hexylene terephthalate isophthalate copolyester has a heat of fusion in the range between about 3 and 6 calories per gram, according to the preparation of terephthalic acid units varying from about 80 to 50 mole %.

Said heat of fusion is defined as the endothermic energy that is due to fusion of a crystalline polymer sample per unit of weight; it is measured by using a conventional differential scanning calorimeter in a nitrogen atmosphere while increasing the temperature at a rate of 10° C/min. The weight of said sample is 10 mg.

The amount of PET or PBT in the blended copolyester layer is in the range of from about 10 to 40 weight %, preferably from about 20 to 30 weight %.

By blending an appropriate amount of polyester with a crystalline copolyester, the surface of the blended copolyester layer becomes slippery, while nevertheless retaining its excellent adhesive strength.

When the amount of the polyester in the blended copolyester layer is lower than about 10 weight %, the laminated surface of the polyester film is sticky or only slightly slippery, and winding or handling of this film becomes very difficult or practically impossible. When the amount of polyester in the blended copolyester layer is higher than about 40 weight %, the laminated polyester film loses its high heat-adhesive strength and transparency, and tends to curl.

The base layer of laminated polyester film of this invention consists essentially of a biaxially oriented PET or PBT layer. However, the copolyester used in the heat-adhesive layer may be contained in the base layer but in an amount of no more than about 20 weight %, preferably no more than about 10 weight %. Otherwise, the physical properties of the base layer are downgraded. This consideration is favorable for subsequent recycling of trimmed edges or waste materials composed of the laminated polyester film as melt-extrusion products.

It is possible to blend and/or copolymerize with various other monomers and polymers, and it is also preferable to add a polyorgano-siloxane and/or inert fine powder of an inorganic compound to the polymer layers for the purpose of improving the slippery characteristics with the polyester film layers.

Polyorgano-siloxane has the following chemical structure:

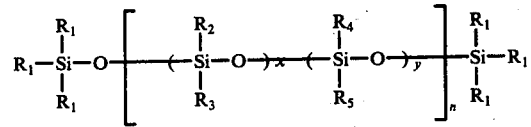

wherein $R_1$, $R_2$, $R_3$, $R_4$ and $R_5$ are selected from the group consisting of —H, alkylaryl group containing 7 – 20 carbon atoms, alkyl groups containing 1 – 20 carbon atoms, phenyl groups and halogenated phenyl groups, and wherein $n$ is an integer and wherein $x$ and $y$ are numbers between 0 and 1, and wherein $x + y = 1$.

The polyorgano-siloxanes comprise, for example, polymethylalkylsiloxanes, such as polydimethylsiloxane, polymethylethylsiloxane and polymethylpropylsiloxane, polydiethylsiloxane, polymethylphenylsiloxane, polydiphenylsiloxane, polyhalogenatedphenylmethylsiloxane, polymethylhydrogensiloxane, and copolyorganosiloxane with any polyorganosiloxanes. The most suitable polyorganosiloxanes for this purpose are polydimethylsiloxane and polymethylphenylsiloxane. The viscosities of these polyorganosiloxanes need to be greater than about 1,000 centistokes, preferably greater than about 3,000 centistokes at 25° C.

Suitable inert fine powders of inorganic compounds include talc, magnesium oxide, silicate, alumina, calcium oxide, titanium oxide, silica gel, barium sulfate, calcium sulfate, magnesium carbonate, calcium carbonate, phosphoric acid, trimethyl phosphoric acid, phosphorous acid and so on. The weight percent of inert fine powders of inorganic compounds for this polyester or copolyester layer is usually from about 0.005 to 5.0 based upon the weight of the layer, preferably from about 0.01 to 1.0. It is possible to improve the slippery properties of the copolyester layer while maintaining its strong heat-adhesive properties by adding this polyorganosiloxane and/or inert fine powder of inorganic compounds to the copolyesters. It is more effective to improve the slipperiness by blending these additives (polyorganosiloxanes and inorganic fine powders) with the copolymer together. The weight percent of these additives for this polymer is also in the aforementioned range. Furthermore, it is desirable and effective to add these materials prior to the polymerization of the copolyesters. It is also possible to blend additives in this polymer layer, such as surface active agents, lubricants, pigments, crystal nucleus agents, platicizers, ultraviolet absorbing agents, antistatic agents, antioxidants and dyestuffs, and to coat the polyvinylalcohol, polyacrylonitrile, polyvinylidenechloride or their copolymers on the surface of the polyester layer or copolyester layer.

In accordance with this invention, it has been found that improved laminated polyester films can be produced without the aforementioned disadvantages, and that the laminated films so produced are transparent, slippery, have high heat-adhesive strength and are inexpensive. These laminated polyester films may be produced in various ways, as follows:

1. A longitudinally oriented PET or PBT film may be laminated with molten or solid butylene terephthalate or hexylene terephthalate copolyester containing PET or PBT to make a double or triple layered film by direct heat-sealing without the use of any adhesive layer. Then this film is oriented transversely and heat-set, or 2. A non-oriented PET or PBT film may be laminated directly with molten or solid butylene terephthalate or hexylene terephthalate copolyesters containing PET or PBT to make a double or triple layered film by heat-sealing without any other adhesive than the layers themselves. Then this laminated film is oriented longitudinally and transversely, and heat-set, or 3. A molten PET or PBT may be laminated with molten butylene terephthalate or hexylene terephthalate copolyesters containing PET or PBT in two manifolds of a laminating die, or in a pipe, to make a double or triple layered film. Then this film is oriented longitudinally and transversely and heat-set.

Of course, it is not intended to restrict ourselves to the above-mentioned processes in manufacturing laminated polyester films. It is also possible to practice the heat-setting portion of the process in two stages: in the first stage the film is heat-set at about 180° to 240° C and in the second stage at about 100° to 175° C.

The total thickness of the laminated polyester film is usually from about 10 to 500μ, preferably from about 12 to 350μ, and the thickness of the copolyester layer is in the range of about 0.1 – 100μ, preferably from about 1 to 50μ. Concerning the ratio of thickness of the PET or PBT polyester layer to the laminated copolyester layer, it is preferable that this ratio be in the range from about 1 to 20, preferably from about 3 to 6.

The heat sealing temperature of the laminated film of this invention is usually from about 100° to 230° C and preferably from about 140° to 200° C.

These laminated polyester films can be produced very efficiently and at low cost since waste materials resulting from subsequent cutting or fabricating operations may be recycled as melt-extrusion products and are conveniently and economically recovered as dibasic acids and glycols by depolymerization. Further, there is no need for any special treatment such as coating the anchor coating agents on the surface of the PET or PBT film for improving adhesion.

EXAMPLE 1

Seven forms of butylene terephthalate isophthalate copolyesters were prepared from 1.4-butanediol, terephthalic acid, and isophthalic acid by changing the mole ratio of the acid components with addition of 20 weight % of PET having an intrinsic viscosity of 0.59.

Each of these butylene terephthalate isophthalate copolyesters for heat-adhesive layers, and PET having an intrinsic viscosity of 0.59 for the base layer, were fed to separate extruders and coextruded by using a die having two manifolds to form double layered polyester sheets. Each double layered sheet was stretched 3.3 times the original length in the longitudinal direction at 85° C and 3.7 times the width thereof in the transverse direction at 90° C, and heat-set at 220° C for 12 seconds. Each of the double layered polyester films had a thickness of 25 microns: the PET layer was 20 microns thick and the copolyester layer was 5 microns thick. There was no other adhesive.

Intrinsic viscosities were measured in o-chlorophenol at 25° C by using a capillary viscometer of the Ubbelohde type. The heat adhesive strengths were measured on samples which had been heat-sealed between the copolyester layers at a temperature of 200° C with a dwell time of 0.5 second and a pressure of 1 kg/cm$^2$. The heat adhesive strengths were expressed as F/W, where F is the maximum tear strength for peeling one of the adhesive layers from the other and W is the width of the sample. The coefficients of friction were measured as F/73, where F is the maximum force for pulling the lower film away from the upper film after two films 4 cm by 5 cm were placed one upon the other with a weight of 73 g on the top.

The properties of the laminated polyester films are shown in Table 1.

Table 1

| Sample No. | Mole % of terephthalate units based on the total acid components of the copolyester | Heat-adhesive strength (g/cm) | Coefficient of friction between copolyester layers |
|---|---|---|---|
| 1 | 100 | 0 | 0.7 |
| 2 | 90 | 50 | 0.7 |
| 3 | 80 | 550 | 0.8 |
| 4 | 70 | 1,000 | 0.8 |
| 5 | 60 | 1,800 | 0.8 |
| 6 | 50 | 2,000 | 2 |
| 7 | 40 | 2,000 | ∞ |

From Table 1 it is clear that the mole % of terephthalate units based on the total acid components of the copolyester should be in the range between about 50 and 80, preferably between about 60 and 70.

EXAMPLE 2

The procedure of Example 1 was followed with the exception that the copolyester of Sample No. 5 in Table 1 of Example 1 was used throughout, while changing the proportion of PET in the copolyester layer. Properties of the laminated polyester films are shown in Table 2.

Table 2

| Sample No. | Weight % of PET in copolyester layer | Heat adhesive strength (g/cm) | Coefficient of friction between copolyester layers |
|---|---|---|---|
| 8 | 0 | 1,900 | ∞ |
| 9 | 5 | 1,800 | ∞ |
| 10 | 10 | 1,800 | 2 |
| 11 | 20 | 1,800 | 0.8 |
| 12 | 30 | 1,800 | 0.7 |
| 13 | 40 | 1,200 | 0.7 |
| 14 | 50 | 500 | 0.6 |

From Table 2 it will be appreciated that the weight % of PET in the copolyester layer should be in the range between about 10 and 40, preferably between about 20 and 30.

EXAMPLE 3

PET having an intrinsic viscosity of 0.60 was cast and stretched 2.8 times the original length in the longitudinal direction at 95° C. Then, a molten copolyester consisting of 65 mole % of terephthalic acid, 35 mole % of isophthalic acid, and 1.4-butanediol, having an intrinsic viscosity of 1.1, and blended with 30 weight % of PET was laminated onto the longitudinally stretched PET film. The double layered polyester film was stretched 2.9 times the width thereof in the transverse direction at 100° C and heat-set for 215° C for 10 seconds. There was no other adhesive used.

The laminated polyester film was 150 microns thick and consisted of a PET layer of 120 microns and a laminated copolyester layer of 30 microns. Properties of the film are shown in Table 3.

Table 3

| Physical properties of Sample No. 15 | Unit | Observed values longitudinal direction | transverse direction |
|---|---|---|---|
| Ultimate strength | kg/mm² | 22 | 28 |
| Ultimate elongation | % | 110 | 80 |
| Young's modulus | kg/mm² | 420 | 460 |
| Heat shrinkage (150° C, 30 min) | % | 0.1 | 0.7 |
| Haze | % | 8 | |
| Heat-adhesive strength | kg/cm | 3.0 | |
| Coefficient of friction | | | |
| between copolyester layers | | 0.9 | |
| between copolyester and PET layers | | 0.5 | |
| between PET layers | | 0.4 | |

EXAMPLE 4

PBT having an intrinsic viscosity of 1.60 was used as base layer. Copolyester, consisting of 65 mole % of terephthalic acid, 35 mole % of isophthalic acid, and 1.4-butanediol, and having an intrinsic viscosity of 0.86, was blended with 20 weight % of PBT and used as heat-adhesive layer.

Both materials were fed to separate extruders and coextruded using a laminating adaptor in a pipe prior to a single manifold die and cast from the die onto a casting drum cooled at 50° C to form a double layered polyester film. The double layered film was then biaxially stretched simultaneously 3.0 times the original dimensions in both longitudinal and transverse directions at 95° C and heat-set at 200° C for 9 seconds. The double layered polyester film so obtained was 125 microns thick: PBT and copolyester layers were 100 and 25 microns thick, respectively. Properties of the laminated polyester film are shown in Table 4. There was no intervening adhesive.

Table 4

| Physical properties of Sample No. 16 | Unit | Observed values longitudinal direction | transverse direction |
|---|---|---|---|
| Ultimate strength | kg/mm² | 19 | 20 |
| Ultimate elongation | % | 130 | 100 |
| Young's modulus | kg/mm² | 290 | 300 |
| Heat shrinkage (150° C, 30 min.) | % | 0.3 | 0.5 |
| Haze | % | 4 | |
| Heat adhesive strength | kg/cm | 2.9 | |
| Coefficient of friction | | | |
| between copolyester layers | | 1.2 | |
| between copolyester and PBT layers | | 0.7 | |
| between PBT layers | | 0.4 | |

EXAMPLE 5

Six types of copolyesters, consisting of 65 mole % of terephthalic acid, 35 mole % of isophthalic acid and glycol (HO—(CH$_2$)$_n$—OH, $n = 2 - 12$), having intrinsic viscosities of from 1.0 to 1.3, and blended with 20 weight % of PET having an intrinsic viscosity of 0.62, were prepared. Laminated polyester films were produced according to the same procedure as in Example 1. The double layered polyester films were 75 microns thick, consisting of a PET layer of 50 microns and a copolyester layer of 25 microns. Properties of the films are shown in Table 5.

Table 5

| Sample No. | No. of methylene units in glycol (n) | Glycol | Heat adhesive strength (kg/cm) | Coefficient of friction between copolyester layers |
|---|---|---|---|---|
| 17 | 2 | 1.2-ethanediol | 0.5 | 3 |
| 18 | 4 | 1.4-butanediol | 3.2 | 0.8 |
| 19 | 6 | 1.6-hexanediol | 2.0 | 0.9 |
| 20 | 8 | 1.8-octanediol | 0.7 | 2 |
| 21 | 10 | 1.10-decanediol | 0.6 | ∞ |
| 22 | 12 | 1.12-dodecanediol | 0.5 | ∞ |

From Table 5 it will be recognized that exceptional results are obtained when the glycol component in the copolyester is either 1.4-butanediol or 1.6-hexanediol. This gives an excellent and balanced combination of heat adhesive strength and slipperiness.

EXAMPLE 6

The procedure of Example 3 was followed with the exception that the base layer consisted of 90 weight % of PET and 10 weight % of a copolyester which was the same as the one in the copolyester layer. Properties of the film are shown in Table 6.

Table 6

| Physical properties of Sample No. 23 | Unit | Observed values | |
| --- | --- | --- | --- |
| | | longitudinal direction | transverse direction |
| Ultimate strength | kg/mm$^2$ | 24 | 28 |
| Ultimate elongation | % | 100 | 85 |
| Young's modulus | kg/mm$^2$ | 450 | 470 |
| Heat shrinkage (150° C, 30 min.) | % | 0.1 | 0.4 |
| Haze | % | 7 | |
| Heat adhesive strength | kg/cm | 3.0 | |
| Coefficient of friction | | | |
| between copolyester layers | | 0.9 | |
| between copolyester and PET layers | | 0.5 | |
| between PET layers | | 0.4 | |

From Table 6 it is seen that the properties of the film in this Example are almost the same as those in Example 3.

We claim the following:

1. A laminated polyester film having improved heat-adhesive strength and slipperiness consisting essentially of a biaxially oriented layer of a terephthalate polymer selected from the group consisting of polyethylene terephthalate and polybutylene terephthalate.

said biaxially oriented terephthalate polymer having at least one surface laminated directly by heat-sealing and without any added adhesive layer to an axially oriented crystalline copolyester layer, the number of axes of orientation being 1 to 2, said crystalline copolyester layer containing from about 10 to 40 weight % of a terephthalate polymer selected from the group consisting of polyethylene terephthalate and polybutylene terephthalate, said crystalline copolyester being selected from the group consisting of butylene terephthalate isophthalate copolyester and hexylene terephthalate isophthalate copolyester, and consisting essentially of from about 50 to 80 mole % of terephthalate units based upon the total number of moles of acid components of the copolyester.

2. The laminated copolyester film of claim 1 wherein said crystalline copolyester contains from about 60 to 70 mole % of terephthalate units based on the total number of moles of acid components of the copolyester.

3. The laminated polyester film of claim 1 wherein the proportion of polyethylene terephthalate or polybutylene terephthalate in the crystalline copolyester layer is in the range of from about 20 to 30 weight %.

4. The film defined in claim 1, wherein said number of axes is 1.

5. The film defined in claim 1, wherein said number of axes is 2.

* * * * *